United States Patent [19]
Kirby

[11] Patent Number: 5,606,245
[45] Date of Patent: Feb. 25, 1997

[54] POWER SUPPLY SYSTEMS

[75] Inventor: James M. Kirby, Bishops Cleeve, England

[73] Assignee: Smiths Industries Public Limited Company, London, England

[21] Appl. No.: 425,659

[22] Filed: Apr. 20, 1995

[30] Foreign Application Priority Data

Jun. 18, 1994 [GB] United Kingdom .................. 9412281

[51] Int. Cl.$^6$ ........................................................ H02P 9/00
[52] U.S. Cl. ................................. 322/8; 322/23; 307/29
[58] Field of Search ........................... 322/8, 18, 33, 322/34; 307/31, 32, 34, 38, 57; 364/492, 494

[56] References Cited

U.S. PATENT DOCUMENTS

| | | | |
|---|---|---|---|
| 3,842,249 | 10/1974 | Geyer et al. | 235/151.21 |
| 4,321,645 | 3/1982 | Thom et al. | 361/63 |
| 4,403,292 | 9/1983 | Ejzak et al. | 364/492 |
| 4,967,096 | 10/1990 | Diemer et al. | 307/19 |
| 5,325,043 | 6/1994 | Parro | 322/23 |
| 5,422,517 | 6/1995 | Verney et al. | 307/29 |

*Primary Examiner*—Steven L. Stephan
*Assistant Examiner*—Nicholas Ponomarenko
*Attorney, Agent, or Firm*—Pollock, Vande Sande & Priddy

[57] ABSTRACT

A power supply system has two power supply generators connected to respective power buses, to which various loads are connected via relays. A monitor unit has a store with information about the thermo-electric performance of the generators and information relating the power drawn from the generator to the time for which that power can be drawn safely. The monitor monitors the power drawn from each generator and the time for which it is drawn and disconnects a load when power is drawn at a level and for a time that exceeds a safety limit in the store. The monitor reconnects a load when the power drawn from the generator and its thermo-electric performance indicate that this can be done safely.

6 Claims, 2 Drawing Sheets

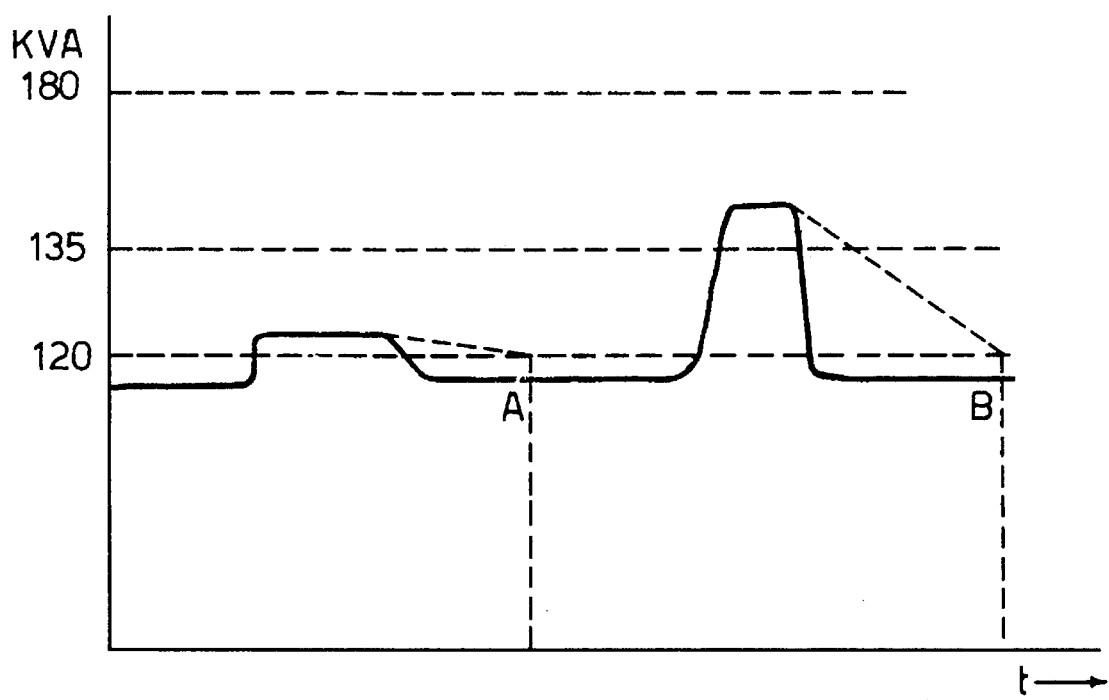

POWER SUPPLY SYSTEMS

BACKGROUND OF THE INVENTION

This invention relates to power supply systems.

The invention is more particularly, but not exclusively, concerned with power supply systems for aircraft.

Aircraft usually have at least two power generators so that the aircraft can fly safely even if one generator should fail. In most aircraft, the generators are able to provide power to all the aircraft equipment continuously, even if all the equipment are operating at their maximum power consumption. Because aircraft equipment only rarely operate at their maximum power level, the generator capacity is usually more than is needed for most situations. The result of this is that the weight of the generators and their associated cabling is more than is strictly necessary and leads to an undesirable payload on the aircraft. Up to now, the systems by which power supply on aircraft are controlled have not enabled the generator capacity of an aircraft to be reduced without a risk of compromising its safety.

Electrical power supplies are also used in applications other than aircraft and, where it is essential to ensure the ability to provide continuous power for all levels of loading, this can lead to excessive capacity and expense.

BRIEF SUMMARY OF THE INVENTION

It is an object of the present invention to provide an improved power supply system.

According to one aspect of the present invention there is provided a power supply system including at least one power supply generator and monitor means for monitoring operation of the or each generator, the monitor means being arranged to monitor the power drawn from each generator and the time for which it is drawn, the monitor means including a store of information relating the power drawn from each generator to the time for which that power can be drawn safely, the monitor means being arranged to store a history of operation of the or each generator, the monitor means being arranged to disconnect a load from the or each generator in the event that power is drawn at a level and for a time that exceeds a safety limit in said store, and the monitor means being arranged to reconnect a load when the power drawn from the or each generator and its history of operation indicate that this can be done safely.

The store of information in the monitor means preferably includes information as to the thermo-electric performance of the or each generator, the monitor means being arranged to reconnect load only when this information indicates that the temperature of the generator has fallen to a safe level.

According to another aspect of the present invention there is provided a power supply system including at least one power supply generator, power monitor means for monitoring the power drawn from the or each generator and the time for which it is drawn, and a temperature sensor for monitoring the temperature of the or each generator, the monitor means including a store of information relating the power drawn from the or each generator to the time for which that power can be drawn safely, the monitor means being arranged to disconnect a load from the or each generator in the event that power is drawn at a level and for a time that exceeds a safety limit in said store, the monitor means being arranged to reconnect a load when the power drawn from the or each generator and its sensed temperature indicate that this can be done safely.

The system preferably includes two generators, each generator being connected to supply power to a respective bus, and at least one load being connected to one bus and another load being connected to the other bus. The system may include a tie interconnection between the two buses and a tie switch connected in the tie interconnection, the monitor means being arranged to open the tie switch when it detects a failure of one of the power generators so that the or each load connected to the bus associated with the failed power generator receives power from the other generator. The or each load may be connected to the or a generator via a relay, the or each relay being connected to the monitor means such that the monitor means controls supply of power to the load by switching of the relay.

According to a further aspect of the present invention there is provided a method of controlling a power supply system including the steps of monitoring the power drawn by a generator, comparing the power drawn against one or more stored values of safe power, measuring the time for which power drawn exceeds a safe power value, comparing the time with a stored value of time for which power drawn can exceed the safe power value, disconnecting load if the time exceeds the stored value of time, deriving a value representative of the decay in temperature of the generator following disconnection of load, and reconnecting load when both the power drawn and the value representative of temperature have fallen to safe levels.

The value representative of the decay in temperature may be derived from a store containing information about the thermo-electric performance of the generator. Alternatively, the value representative of the decay in temperature may be derived from a temperature sensor monitoring the actual temperature of the generator.

An aircraft power supply and its methods of operation, will now be described, by way of example, with reference to the accompanying drawings.

BRIEF DESCRIPTION OF THE DRAWINGS

FIG. 2 illustrates operation of the system.

DETAILED DESCRIPTION OF THE PREFERRED EMBODIMENTS

Figure 1:
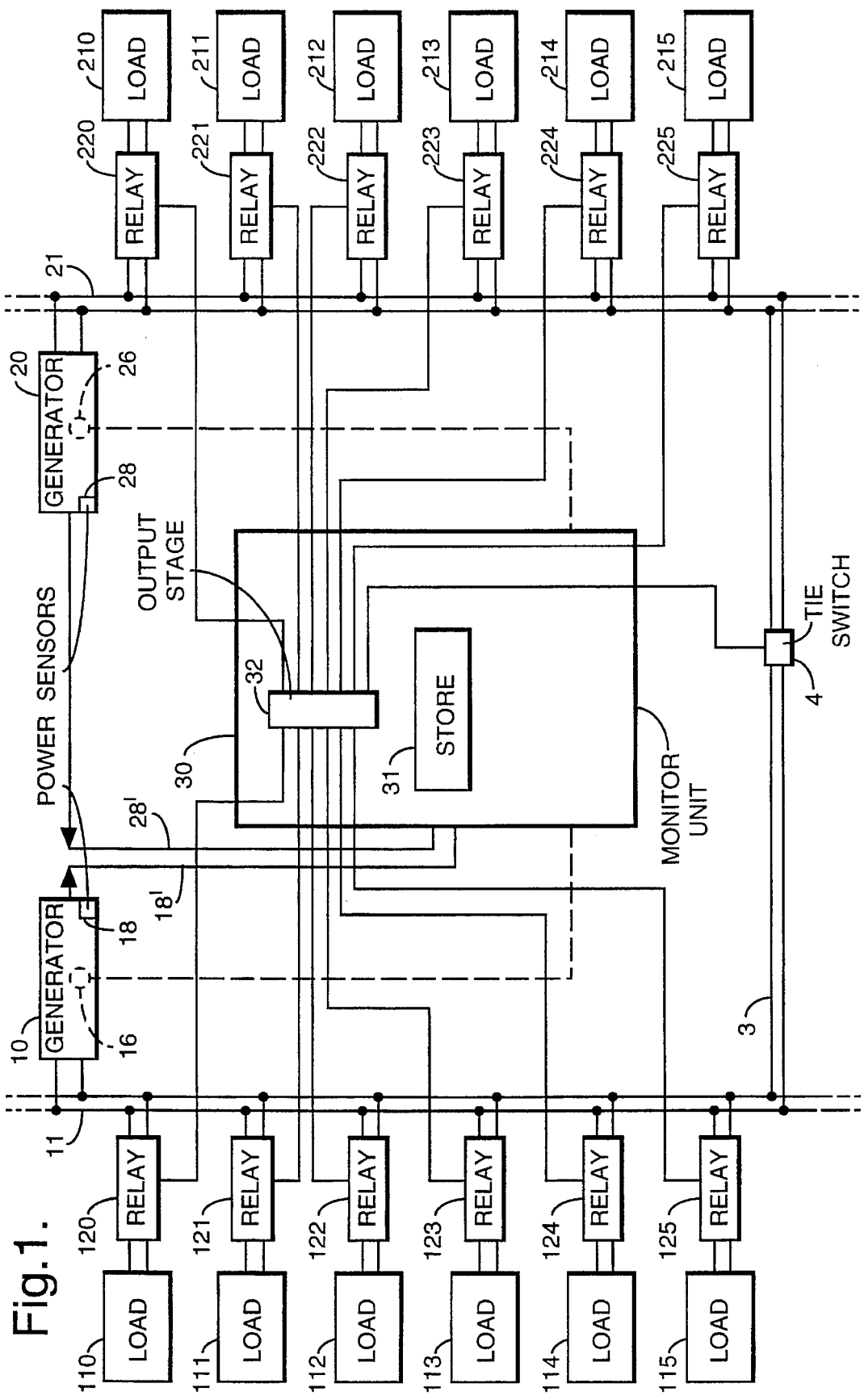
FIG. 1 shows the system schematically.

The power supply system includes two power generators 10 and 20, which are both rated at 120 kVA continuous operation. The generators 10 and 20 can both be overloaded safely for limited times. Between 120–135 kVA, the generators can be operated safely for five minutes. Between 135–180 kVA, the generators can be operated safely for five seconds. The generators should not be operated above 180 kVA for more than 5 ms.

The left-hand generator 10 is connected to a left-hand power bus 11 whereas the right-hand generator 20 is connected to a right-hand power bus 21. The two buses 11 and 21 are electrically isolated from one another but can be interconnected via a tie interconnection 3 and a tie switch 4 if one of the generators should fail, so that the other generator can supply power to the bus of the non-operational generator.

Various items of electrical equipment or other loads 110 to 115 are connected to the left-hand bus 11 via respective relays 120 to 125. Similarly, loads 210 to 215 are connected to the right-hand bus 21 via relays 220 to 225.

The system includes a control monitor unit 30 with an output stage 32 by which operation of the relays 120 to 125 and 220 to 225 is controlled and to which the relays are connected. The monitor unit 30 also controls operation of the tie switch 4. The unit 30 includes a store 31 containing the information about the power that can be drawn safely from the generators 10 and 20 and the time for which the power can be drawn. Both generators 10 and 20 include a power sensor 18 and 28 respectively, which monitor the power drawn from the generators. This information is supplied to the control unit 30 via lines 18' and 28'.

The store 31 also stores information about the history of operation of the generators 10 and 20, in particular, the power drawn by each generator and the time for which it is drawn. This information may be stored continuously or only when the generators are overloaded. The store 31 also contains information about the operation of the generators and, in particular, information about the thermo-electric performance of the generators, that is, how quickly they heat up while overloaded and how quickly they cool down after power is shed.

FIG. 2 illustrates an example of overloading of a generator. The left-hand part of the solid line shows an increase in power drawn from one of the generators 10 or 20 that rises above the 120 kVA level to about 123 kVA. When power exceeds the 120 kVA level for more than 5 minutes, the control unit 30 progressively sheds load to reduce power drawn back below the 120 kVA level. This is achieved by opening selected ones of those of the relays 120 to 125 and 220 to 225 that connect less important equipment, such as the aircraft galley, to the power bus 11 or 21. Sufficient equipment is disconnected to ensure that the power drawn from the generator falls to a safe level, as illustrated by the fall in the solid line. The broken line, however, illustrates the thermal performance of the generator. It can be seen that the temperature of the coils of the generator decay to a safe level at a more gradual rate than the power load on the generator. If load were to be reconnected to the generators 10 and 20 immediately after the total load had fallen to a safe level, the temperature of the coils of the generator could still be above the safe level and, once the additional load were connected, this could lead to the temperature of the coils rising above a safe level because of the residual heat in the coils, even though the power had fallen below a safe level. The control unit 30 utilizes the historical information and the information about the thermo-electric performance of the generators to determine that additional load can only safely be connected to the generator at point A, when the temperature of the generator coils have fallen below a level equivalent to a steady load of 120 kVA.

Similarly, the right-hand part of FIG. 2 illustrates a rise above the 135 kVA level, with the broken line showing how the fall in temperature of the coils lags behind the reduction in power below 120 kVA. In this case, additional load can only be safely connected to the generator at the point B.

The arrangement described above utilizes knowledge of the operation of the generators 10 and 20 and knowledge of the load drawn from the generators over a period of time to predict how the temperature of the generator coils will fall in time. Alternatively, it would be possible for the generators to include a coil temperature sensor 16 and 26 to provide an output representative of the coil temperature so that load was not applied to the generator until the sensed temperature had fallen to a safe level.

Although previous power management systems have been able to respond to overloading of a generator by shedding load, it has not previously been readily possible to continue operation during the overload period when, in fact, the generator can safely deliver such an overload for a predetermined period. This has, therefore, resulted in unnecessary shedding of loads. In addition, with previous systems, it has not been readily possible to restore load when sufficient power becomes available. For example, if one generator should shut down for a short period, resulting in the galley being disconnected, in the past this meant that the galley remained disconnected for the entire flight, even though sufficient power might be available after a few minutes. The present invention safely enables power to be restored to equipment when this can be done without risk of damage.

What I claim is:

1. A power supply system comprising: at least one power supply generator and a monitor unit, said monitor unit being operative to monitor operation of said generator, said monitor unit being operative to monitor the power drawn from said generator and the time for which it is drawn, said monitor unit including a store containing information as to the thermo-electric performance of said generator relating the power drawn from said generator to the time for which that power can be drawn safely, and also containing a history of operation of said generator comprising information about the power drawn and the time for which power is drawn, said monitor unit being operative to disconnect a load from said generator in the event that power is drawn at a level and for a time that exceeds a safety limit in said store, and said monitor unit being operative to reconnect a load when the power drawn from said generator and its history of operation indicate that the temperature of said generator has fallen to a safe level.

2. A power supply system according to claim 1, wherein the system includes two generators, two buses, a connection between each generator and a respective one of said buses so that the generators supply power to said respective buses, a connection between at least one load and one of said buses, and a connection between another load and another of said buses.

3. A power supply system according to claim 2, wherein the system includes a tie interconnection between said two buses and a tie switch connected in the tie interconnection, said monitor unit being operative to open the tie switch when it detects a failure of one of said power generators so that the or each load connected to the bus associated with the failed power generator receives power from the other of said generators.

4. A power supply system according to claim 1 including at least one relay, a connection between the or each load and the or a generator via one of said relays, and a connection between the relay and said monitor unit such that said monitor unit is operative to control supply of power to the load by switching of said relay.

5. A power supply system according to claim 1, wherein the or each power supply generator includes a power sensor arranged to monitor power drawn from the generator, and a connection between an output of said power sensor and said monitor unit.

6. A method of controlling a power supply system including the steps of monitoring the power drawn by a generator, comparing the power drawn against one or more stored values of safe power, storing historical information about the power drawn and the time for which it is drawn, measuring the time for which power drawn exceeds a safe power value, comparing the measured time with a stored value of time for which power drawn can exceed the safe power value, disconnecting load if the measured time exceeds the stored value of time, deriving from a store containing information about the thermo-electric performance of the generator a value representative of the decay in temperature of the generator following disconnection of load, and reconnecting load when both the power drawn and the value representative of temperature have fallen to safe levels.

* * * * *